US006678141B2

(12) United States Patent
Schmidt et al.

(10) Patent No.: US 6,678,141 B2
(45) Date of Patent: Jan. 13, 2004

(54) ELECTRICAL COMPONENT WITH FAULT ARC PROTECTION

(75) Inventors: Walter Schmidt, Bellikon (CH); Robert Hauser, Berikon (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 10/207,775

(22) Filed: Jul. 31, 2002

(65) Prior Publication Data

US 2003/0030957 A1 Feb. 13, 2003

(30) Foreign Application Priority Data

Aug. 10, 2001 (EP) .......................................... 01810770

(51) Int. Cl.[7] ................................................ H02H 1/00
(52) U.S. Cl. ....................................... 361/128; 361/128
(58) Field of Search ................................ 361/117, 118, 361/126, 127, 128, 130, 131

(56) References Cited

U.S. PATENT DOCUMENTS

| | | | | | |
|---|---|---|---|---|---|
| 5,903,427 | A | | 5/1999 | Roby | |
| 6,018,453 | A | | 1/2000 | Daharsh et al. | |
| 6,049,049 | A | * | 4/2000 | Lindberg | 218/143 |
| 6,441,310 | B1 | * | 8/2002 | Niedermier et al. | 174/137 A |
| 6,466,425 | B1 | * | 10/2002 | Shirakawa et al. | 361/117 |
| 6,493,201 | B1 | * | 12/2002 | Kulkarni et al. | 361/119 |
| 6,496,349 | B1 | * | 12/2002 | Siljeholm | 361/118 |

FOREIGN PATENT DOCUMENTS

| | | |
|---|---|---|
| DE | 970 313 | 9/1958 |
| DE | 974 620 | 5/1961 |
| DE | 931 475 | 8/1995 |

* cited by examiner

*Primary Examiner*—Gregory J. Toatley, Jr.
*Assistant Examiner*—Danny Nguyen
(74) *Attorney, Agent, or Firm*—Burns, Doane, Swecker & Mathis, L.L.P.

(57) ABSTRACT

The component with fault arc protection has an insulator in the form of a pillar, a first electrical conductor system which is provided on the insulator head and can be connected to high-voltage potential, and a second electrical conductor system which is provided on the insulator foot and can be connected to a ground potential. Each of the two electrical conductor systems contains an arcing electrode (7) for dissipating any fault arc which occurs in the event of a discharge between the two electrical conductor systems. The fault arc is dissipated particularly effectively if at least one of the two arcing electrodes (7) is in the form of a cup and has a cup base (12), which is attached to one electrical connection of the first or of the second electrical conductor system, as well as a cup wall (13) which is adjacent to the cup base (12) and extends predominantly in the direction of the axis (2) of the pillar. In this case, at least two material recesses are formed, which extend from the cup base (12) to the cup rim (9, 10) and are predominantly in the circumferential direction in the cup wall (13).

9 Claims, 2 Drawing Sheets

ELECTRICAL COMPONENT WITH FAULT ARC PROTECTION

FIELD OF THE INVENTION

The invention is based on an electrical component with fault arc protection, as claimed in the precharacterizing clause of patent claim 1. This component has an insulator in the form of a pillar, to whose head a first electrical conductor system is attached which can be connected to a first electrical potential, in particular a high-voltage potential. A second electrical conductor system is attached to the insulator foot, and can be connected to a second electrical potential, in particular ground potential. The first and the second electrical conductor systems each have an arcing electrode, which arcing electrodes each themselves contain one of two electrode sections which have an annular shape and which are separated from one another in the direction of the pillar axis and are separated from the insulator in the radial direction. Any fault arc which is formed in the event of an undesirable discharge between the two electrical conductor systems is commutated onto the annular electrode sections. The influence of the magnetic field of the current flowing in the annular electrode sections now causes the predominantly axially aligned fault arc to rotate and then to be quenched, for example at the current zero crossing.

BACKGROUND OF THE INVENTION

The precharacterizing clause of the invention refers to a prior art for electrical components with fault arc protection as is described in U.S. Pat. No. 5,903,427 A. An electrical component with fault arc protection as described in this patent publication contains two electrical conductor systems which are held by an outdoor insulator, in the form of a pillar, such that they are electrically isolated from one another, and which are at different electrical potentials. Each of these systems contains its own conductor section, which is in the form of an open, annular loop and is routed around the insulator in the region of the insulator head or insulator foot, respectively, with a gap. If an undesirable fault arc occurs on the component during operation of the component in a high-voltage system—for example due to a lightning strike or due to a switching process—then the fault arc is guided into a current path which contains the conductor sections as arcing electrodes. The fault arc is now aligned predominantly axially and has its base on the two annular arcing electrodes, which are in the circumferential direction. The electromagnetic forces cause the fault arc, which is based on the arcing electrodes, to rotate about the insulator of the component until it is quenched, for example at the zero crossing of the fault arc current. The component is thus protected against the eroding and corroding effect of the fault arc.

A further electrical component with fault arc protection and which is in the form of a surge arrestor is specified in U.S. Pat. No. 6,018,453 A. In this component as well, undesirable fault arcs are commutated onto two arcing electrodes, which are spaced apart from one another in the direction of one axis of the component, in order to be forced to rotate about that axis and thus to be quenched, for example at the zero crossing. However, in contrast to the abovementioned prior art, the two arcing electrodes in the case of this component are each in the form of a plate, and a large number of predominantly radial slots are integrally formed in each of the plates.

SUMMARY OF THE INVENTION

The invention, as it is defined in the patent claims, achieves the object of specifying an electrical component with fault arc protection of the type mentioned initially, in which the eroding and corroding effect of undesirable fault arcs is, in particular, suppressed particularly effectively.

In the component according to the invention, at least one of the two arcing electrodes is in the form of a cup and has a cup base, which is attached to one electrical connection of the component, as well as a cup wall, which is adjacent to the cup base and extends predominantly in the direction of the axis of the insulator, and in which at least two material recesses are formed which extend from the cup base to the cup rim and are predominantly in the circumferential direction. Designing the arcing electrode in the form of a cup makes it easier for a fault arc, which is formed during operation of the electrical component according to the invention in a high-voltage system, to move outward from its point of origin on the component to the rim of the cup. Since, in the cup wall, the arcing current flows in a number of electrical conductor elements which are predominantly in the circumferential direction with some of them being arranged axially one above the other in the form of a coil, and which are bounded by material recesses, a strong, predominantly radially directed, magnetic field is formed at the base point of the fault arc. An electrodynamic force which is directed at right angles to the magnetic field and at right angles to the arc axis, and which causes the arc to rotate rapidly, as desired, about the axis of the component, now acts on the fault arc, which is predominantly in the axial direction. The fault arc can thus very quickly be moved away from those regions of the component according to the invention which are at risk of arcing erosion and arcing corrosion, virtually independently of the intensity and position of the fault arc, and can be quenched.

The design of the arcing electrode as a cup is of major importance to the stabilization of the fault arc, since the arcing base point is fixed in the axial and radial directions on the cup rim, and can now move in the desired manner in the circumferential direction. In order to keep the material erosion on the arcing electrode as small as possible, it is recommended that the cup rim be formed from fire-resistant material.

A particularly effective embodiment of the cup wall as a coil, and hence particularly rapid rotation of the fault arc, are achieved if at least one of the two material recesses is in the form of a slot and has two sections of different width. In this case, a section which is adjacent to the cup base and has a large slot width is in the circumferential direction while, in contrast, a second section which is adjacent to this section and has a small slot width is predominantly in the circumferential direction and in the axial direction.

Sufficiently good protection against fault arcs is in general achieved if the cup wall is arranged inclined through an angle of more than 10° but less than 90° with respect to the cup base. The protection is optimized with an inclination angle of 30° to 60°, preferably approximately 45°.

For sufficiently good arc protection for the component according to the invention, it is important that the height of the arcing electrode, which extends in the direction of the pillar axis, is at least 0.1 and at most 0.5 times its diameter. Such a shape can be achieved by casting or by forming, for example crimping, of a round circular plate which contains preformed material recesses and has a wall thickness of between 2 and 25 mm.

In general, in the component according to the invention, the insulator is hollow and an active part, which is guided axially by the insulator, is provided. Particularly preferred components are an outdoor bushing and a surge arrestor, in particular with an active part based on metal oxide.

BRIEF DESCRIPTION OF THE DRAWINGS

The invention will be explained in the following text with reference to exemplary embodiments. In the figures.

DETAILED DESCRIPTION OF THE INVENTION

Figure 1:
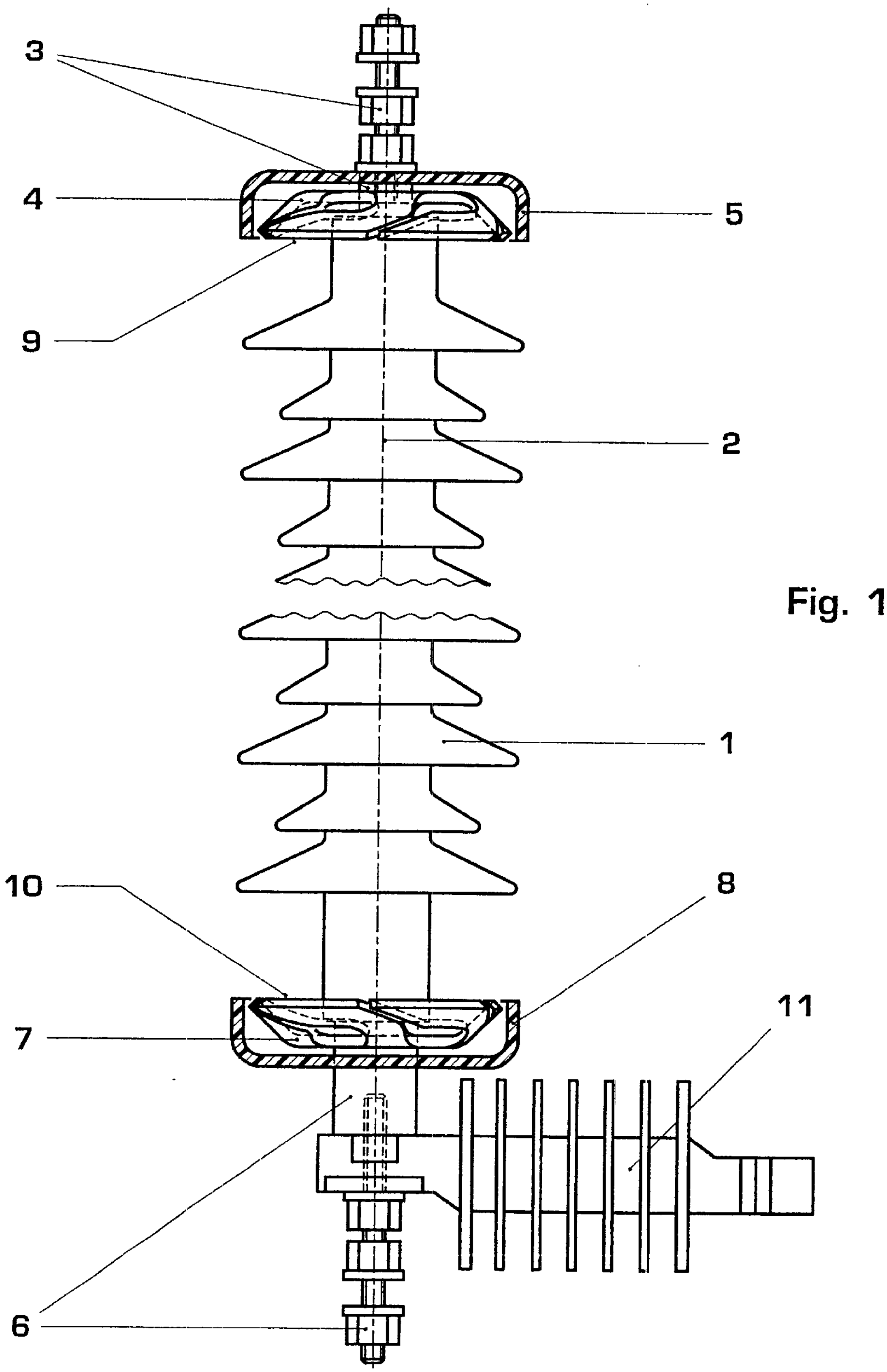
FIG. 1 shows a side view of a component according to the invention, in the form of a surge arrestor, with two arcing electrodes and with two covering shrouds, which are illustrated cut away.

In the figures, identical parts are identified by identical reference symbols. The surge arrestor illustrated in FIG. 1 has an outdoor insulator 1, which is in the form of a pillar and is formed, for example, from a polymer, such as a polymer based on epoxy or silicone, or a ceramic, for example a porcelain. The insulator is hollow and has an active part, which is arranged along an axis 2 (pillar axis) but cannot be seen in the figure, with at least one nonlinear resistance element, preferably based on metal oxide, in particular such as zinc oxide.

A first electrical conductor system is provided, which can be connected to a first electrical potential, for example a high-voltage potential. The first electrical conductor system is electrically conductively connected to the head end of the active part and has an electrical connection 3, which can be connected to a high-voltage line, and an arcing electrode 4 which is in the form of a cup and is aligned concentrically with respect to the axis 2, such that it is open toward the insulator base. The arcing electrode 4 is concentrically surrounded by a covering shroud 5 which is closed at the top. A second electrical conductor system is provided on the insulator base, and can be connected to a second electrical potential, for example ground potential. The second electrical conductor system is electrically conductively connected to the base end of the active part and has an electrical connection 6, which can be connected to a ground conductor, and an arcing electrode 7 which is in the form of a cup and is aligned concentrically with respect to the axis 2 such that it is open toward the insulator head. The arcing electrode 7 is concentrically surrounded by a covering shroud 8 which is closed at the top. The two arcing electrodes 4 and 7 are composed of electrically highly conductive material, in particular of copper or of a copper alloy. That rim 9 of the arcing electrode 9 which points downward and that rim 10 of the arcing electrode 7 which points upward are each manufactured from fire-resistant material, for example from a high-melting-point copper/zinc, copper/tungsten or copper/chromium alloy.

The surge arrestor is held by an insulator 11 which is attached to the electrical connection 6. The two arcing electrodes 4, 7 are arranged with mirror-image symmetry with respect to one another.

Figure 2:
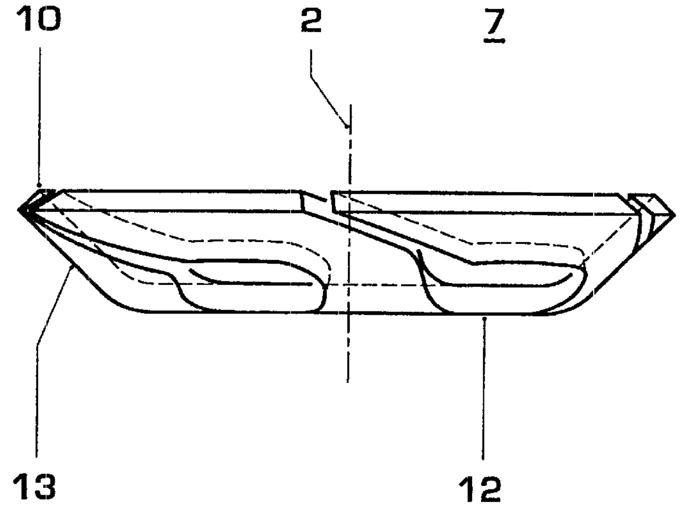
FIG. 2 shows a side view of one of the two arcing electrodes of the surge arrestor shown in FIG. 1.
Figure 3:
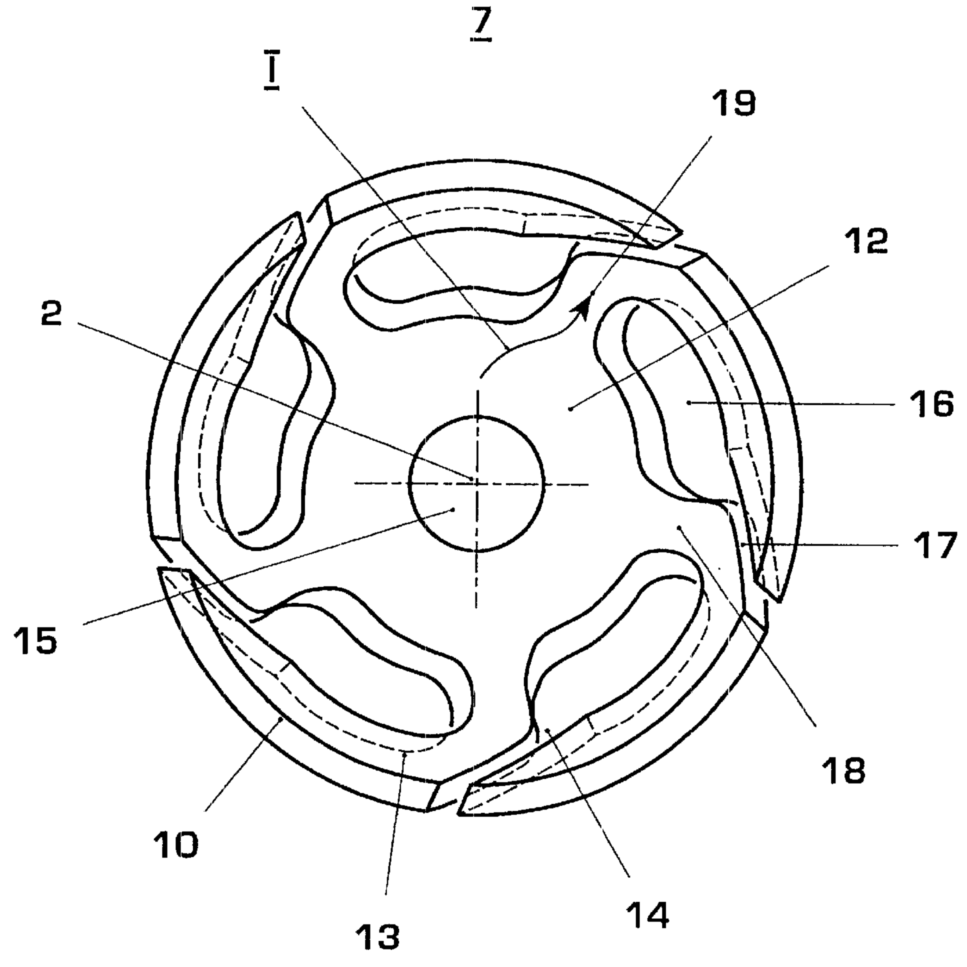
FIG. 3 shows a plan view of the arcing electrode shown in FIG. 2.

FIGS. 2 and 3 show the construction of the arcing electrode 4. It can be seen from these figures that the arcing electrode 7 has a cup base 12 as well as a cup wall 13, which is adjacent to the cup base and extends predominantly in the direction of the axis 2 of the pillar, and in which five material recesses are formed, which extend from the cup base 12 to the cup rim 10, are predominantly in the circumferential direction, and are in the form of slots 14. An opening 15 is provided centrally with respect to the axis 2 in the cup base 12, and a section of the electrical connection 6, which is illustrated only in FIG. 1, is passed through it.

Each of the five slots 14 has two sections 16, 17 of different width, of which one section 16, which is adjacent to the cup base 12, has a large slot width and is in the circumferential direction. In contrast, a section 17 which is adjacent to the section 16 has a small slot width and is predominantly in the circumferential direction, and in the axial direction toward the cup rim 10. Two adjacent slots 14 are separated from one another by an electrical conductor track 18 formed from the same material as the cup wall. This electrical conductor track 18 is routed predominantly axially between the slot sections 16 of the two adjacent slots 14, and then predominantly in the circumferential direction between the slot section 17 of the one slot 14 and the slot section 16 of the other slot 14, as far as the cup rim 10.

This surge arrestor now operates as follows: if an undesirable fault arc occurs between the electrical connections 3 and 6 on the active part and/or on the insulator 1 during operation of the surge arrestor in a high-voltage system, then the base points of the fault arc (see FIG. 3, in which one of the two base points annotated by the reference symbol 19 is shown, together with the feed current I for the fault arc) are each guided onto one of the two arcing electrodes 4 and 7 under the influence of the magnetic field of the fault arc itself, where it is guided predominantly radially outward on the cup base 12. The base point 19 of the fault arc is, finally, guided onto the cup rim 10 via one or more of the electrical conductor tracks 18 arranged in the cup wall 13. At the junction between the cup base 12 and the cup wall 13, the current I (FIG. 3) which feeds the fault arc flows in a curved section of the electrical conductor track 18. This curvature increases the magnetic field produced by the feed current I acting on the base point of the fault arc, and in consequence also results in an electrodynamic force which guides the fault arc outward toward the cup rim 10. In the outer sections of the conductor tracks 18, which are predominantly in the circumferential direction, the magnetic field of the feed current I is directed radially outward at the location of the arc base point, so that the fault arc is acted on by an electrodynamic force, which is directed in the circumferential direction and causes the fault arc to rotate until it is quenched at the current zero crossing.

The two [lacuna], which are composed of insulating material, preferably such as a polymer based on silicone, epoxy, polycarbonate or polyamide, to which fillers are advantageously added, in particular such as flame-restricting lean materials, protect the arcing electrodes 4, 7 against contact, for example by animals or by items falling off. At the same time, the environment is also protected against the influence of heated material, which may be shot away from the component under the influence of the fault arc, and represents a not inconsiderable fire risk. Components protected in this way can thus be used without any problems in dry regions with vegetation resulting in a fire hazard, such as dried-out grass or shrubbery.

It has been found that the fault arc can be guided in a particularly highly safe manner outward away from the insulator if the cup wall 13 is arranged inclined at an angle of 30° to 60°, preferably approximately 45°, with respect to the cup base, and if the height of the arcing electrode 4 or 7, which extends in the direction of the pillar axis 2, is at least 0.1 times its diameter, and at most 0.5 times its diameter.

The material recesses which are provided in the arcing electrodes 4 and 7 need not necessarily be in the form of slots 14, but may also be in the form of grooves. Furthermore, with certain components, it may be sufficient for only one of the two arcing electrodes 4 or 7 to be in the form a cup.

| LIST OF REFERENCE SYMBOLS | | |
|---|---|---|
| [0024] | 1 | Insulator |
| [0025] | 2 | Axis |
| [0026] | 3, 6 | Electrical connections |
| [0027] | 4, 7 | Arcing electrodes |
| [0028] | 5, 8 | Covering shrouds |
| [0029] | 9, 10 | Cup rims |
| [0030] | 11 | Insulator |
| [0031] | 12 | Cup base |
| [0032] | 13 | Cup wall |
| [0033] | 14 | Slots |
| [0034] | 15 | Opening |
| [0035] | 16, 17 | Slot sections |
| [0036] | 18 | Electrical conductor tracks |
| [0037] | 19 | Base point of a fault arc |
| [0038] | I | Feed current for the fault arc |

What is claimed is:

1. An electrical component with fault arc protection, comprising:

an insulator in the form of a pillar;

a first electrical conductor system; and a second electrical conductor system; wherein the first electrical conductor system is provided on a head of the insulator and can be connected to a first electrical potential, and the second electrical conductor system is provided on a foot of the insulator and can be connected to a second electrical potential;

the first and the second electrical conductor systems each include an arcing electrode for dissipating any fault arc that occurs in the case of a discharge between the first and second electrical conductor systems; and at least one of the two arcing electrodes is in the form of a cup, a base of the cup is attached to one electrical connection of the first or of the second electrical conductor system, a wall of the cup adjacent to the cup base extends predominantly in the direction of the axis of the pillar, and at least two material recesses extending from the cup base to a rim of the cup predominantly in the circumferential direction are formed in the cup wall.

2. The component as claimed in claim 1, wherein the cup rim is formed from fire-resistant material.

3. The component as claimed in claim 1, wherein at least one of the two material recesses is in the form of a slot and has two sections of different width, of which a first section, which is adjacent to the cup base and has a large slot width, is in the circumferential direction, and a second section, which is adjacent to the first section and has a small slot width, is predominantly in the circumferential direction and in the axial direction.

4. The component as claimed in claim 1, wherein the cup wall is arranged inclined through an angle of 30° to 60° with respect to the cup base.

5. The component as claimed in claim 1, wherein the height of the arcing electrode, which extends in the direction of the axis, is at least 0.1 and at most 0.5 times its diameter.

6. The component as claimed in claim 1, wherein the arcing electrode is formed by casting or by forming of a plate which contains preformed material recesses.

7. The component as claimed in claim 1, wherein the insulator is hollow and has an axial active part.

8. The component as claimed in claim 7, wherein the component is in the form of an outdoor bushing.

9. The component as claimed in claim 7, wherein the component is in the form of a surge arrestor with an active part based on metal oxide.

* * * * *